Sept. 12, 1961  A. R. CUNNINGHAM  2,999,348
WINDROWER MECHANISM
Filed April 20, 1959  3 Sheets-Sheet 1
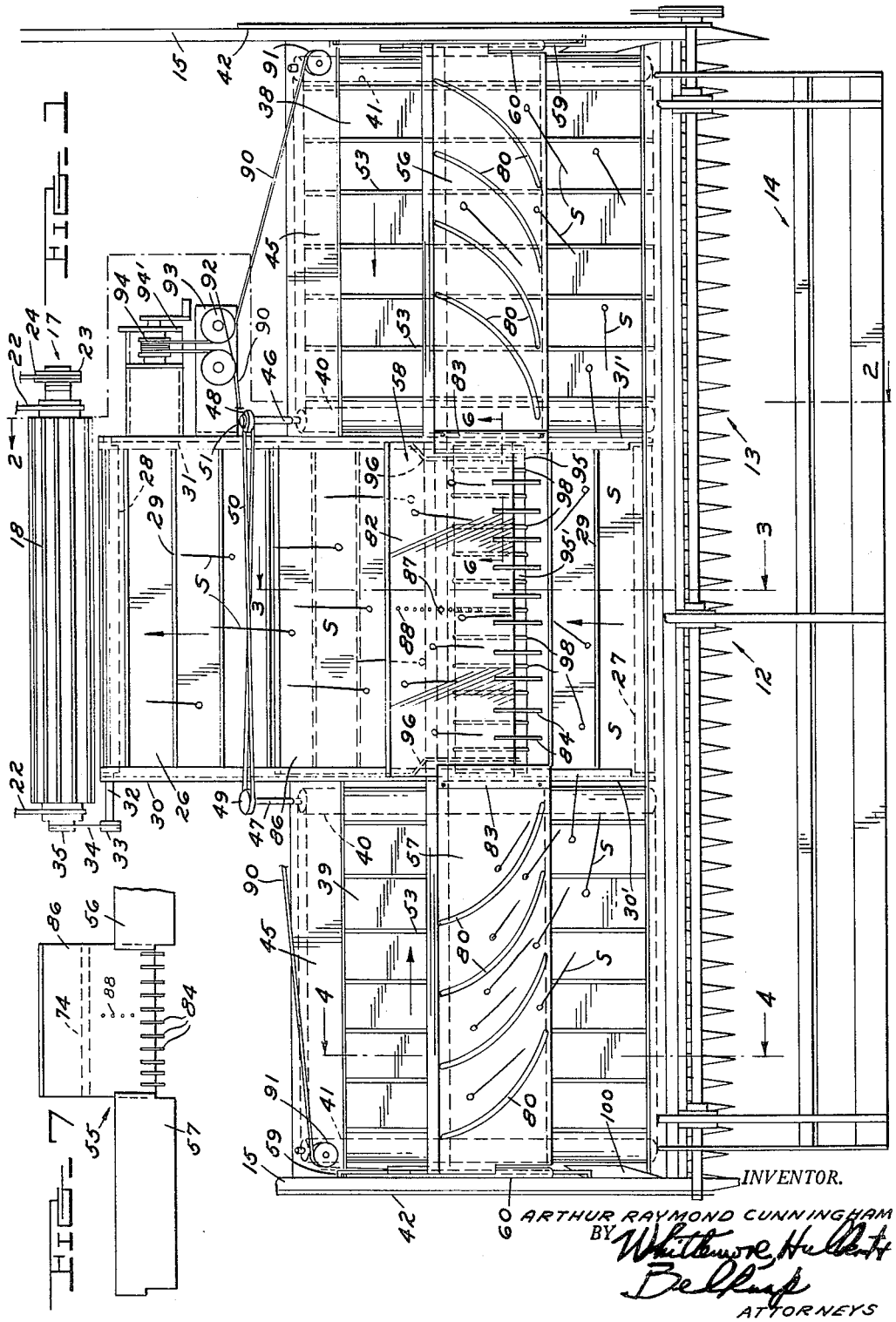
INVENTOR.
ARTHUR RAYMOND CUNNINGHAM
BY
ATTORNEYS

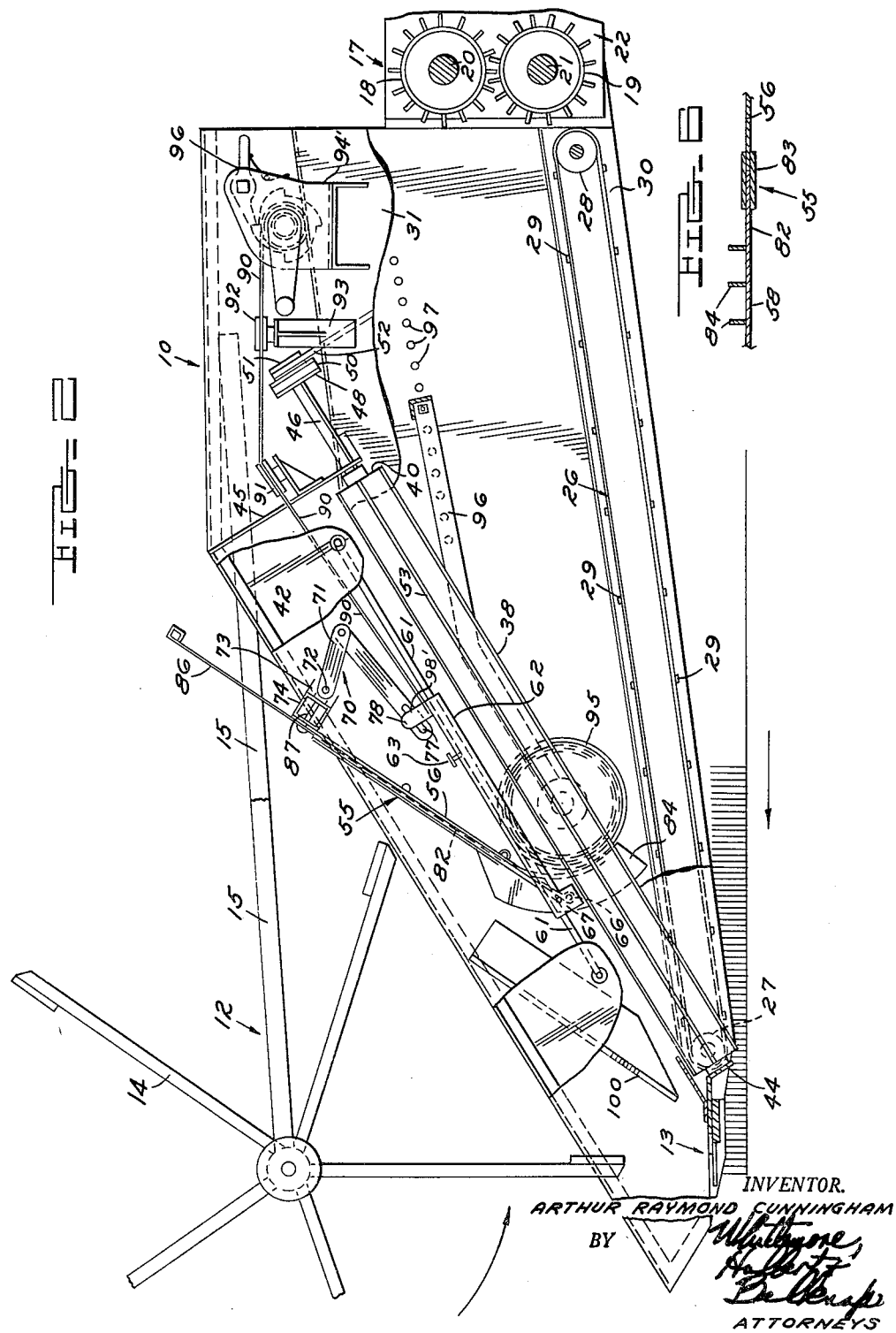

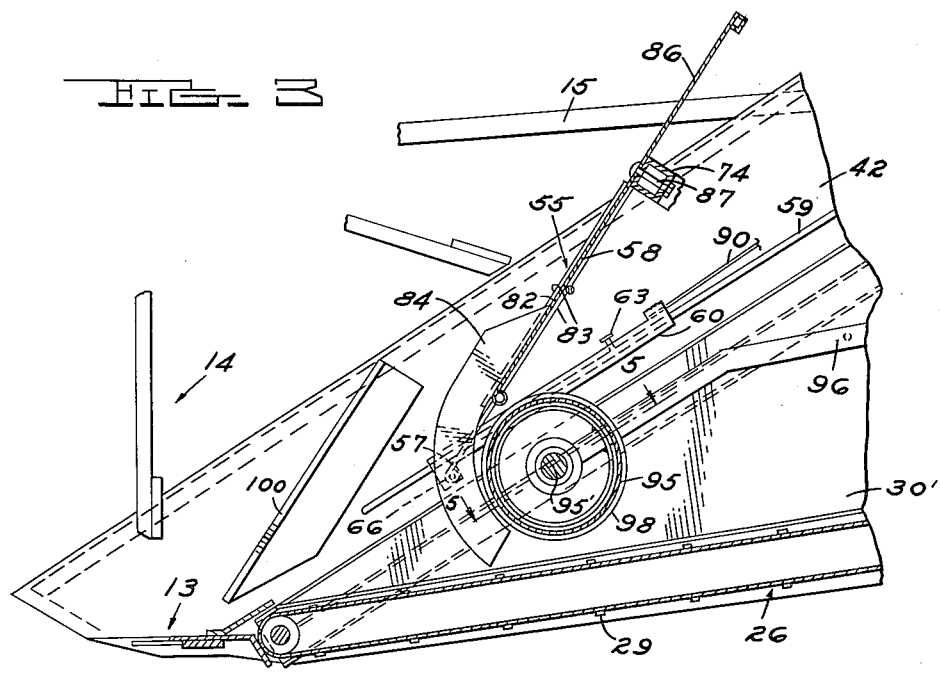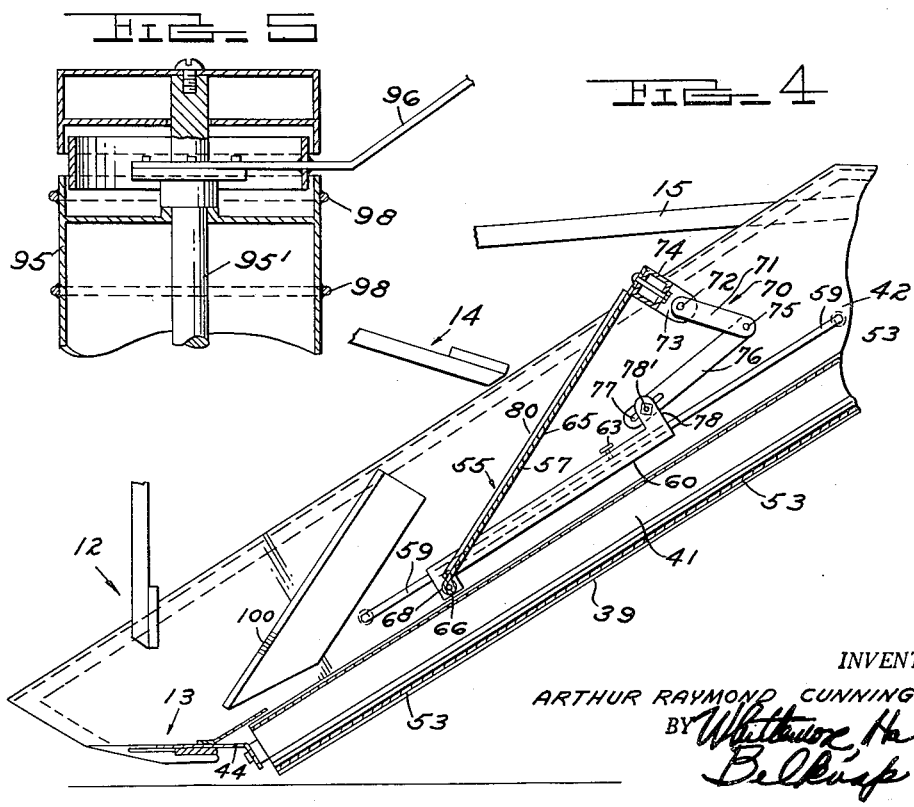

United States Patent Office 2,999,348
Patented Sept. 12, 1961

2,999,348
WINDROWER MECHANISM
Arthur Raymond Cunningham, Chicago, Ill., assignor to Cunningham & Sons, Chicago, Ill., a partnership
Filed Apr. 20, 1959, Ser. No. 807,616
12 Claims. (Cl. 56—23)

The proper windrowing of hay should take into account the importance of maintaining therein the proper overall moisture when cut and lying windrowed in the field, for if excessive moisture is present the hay will rot, and this commonly arises mainly be reason of excessive moisture in the stem of the hay, for there is ordinarily not sufficient moisture in the leaf to produce rotting. Thus, if the stem is left with its butt facing downwardly, it tends to retain moisture unduly and rot sets in, and the leaves tend to dry out and lose food value.

It is therefore a general object of the present invention to provide an improved windrower mechanism, adapted to be employed in association with a suitable type of hay conditioner acting to break the stems or stalks, in which, following cutting by the usual bat-type equipment, the stems are reversed as to the direction in which the stems or stalks extend, so that after passing through the hay conditioner the butts thereof will come to rest on the field stubble in a reversed or backward position, extending upwardly and forwardly of the direction of travel of the equipment, so as to dry properly with the leaves and prevent rot and loss of food value.

In the attainment of this objective, the invention provides, in combination with a conventional type bat cutter apparatus, an arrangement of longitudinally and transversely traveling, belt-type aprons, and appropriate fixed but adjustable drag elements, upon which the cut hay is deposited upon cutting, and then progressively handled by the aprons and drags to reverse the direction of the stems and feed the hay, thus reversed in orientation, to the conditioner.

More specifically, the longitudinally traveling belt or apron is disposed along the longitudinal center line of the equipment, in reference to the direction of its advance, the upper reach of this apron traveling toward the rear; and the transversely traveling aprons are arranged on either opposite side of the longitudinal apron with their upper reaches traveling toward the latter.

In accordance with a further specific object of the invention, there are provided two different types of fixed but longitudinally adjustable drags, i.e., a drag disposed over each transversely operating apron and extending in the direction of travel of its upper reach, and a central drag positioned between these two drags, and in a common plane of inclination at an acute angle to the path of longitudinal travel of the longitudinal apron. As received upon the transversely operating side aprons and controlled by the side drags thereabove, the hay progressively advances laterally inwardly toward the longitudinally working apron, and is deposited upon the latter. Along with hay deposited directly upon the central drag, it has the direction of its stalks reversed as it is advanced rearwardly by the longitudinal apron to the conditioner, the butt ends of the hay facing in the direction of advance of the equipment.

Still more specifically, it is an object to provide windrower equipment of this description, in which the aprons have projecting cleats and the fixed side drags are provided with shaped ribs on the upper surfaces thereof, thus to asist materially in the reversal of position of the hay stems as they are moved toward the central longitudinal operating apron.

A still further object is to provide windrower apparatus of the sort referred to, in which the guiding action on the hay stems is further assisted by a laterally extending central floating or idler roll or drum. This drum is adjustable in the front-to-rear direction, and is provided with suitable parallel and annular, radially projecting ribs between which the stems are disposed and guided. The central drag unit also has appropriate vertical and parallel separator plate provisions for coaction with the drum.

Yet another object is to provide equipment as described, in which all drag elements are mounted for adjustment as desired, in order to maintain desired positional relationship thereof to the idler roller mentioned in the preceding paragraph.

In general, it is an object to provide windrower equipment for association with hay cutter and conditioning structure which is extremely versatile in regard to the number of combinations of its components, discussed above, and which may be optionally set up for use in accordance with the particular conditions existing.

Thus it is contemplated that all of the adjustably fixed drag members may be employed in combination with the transversely and longitudinally operating aprons, or that any desired sub-combinational arrangement of the drags may be employed, with or without the drum; or in which the traveling aprons may be driven at varying relative speeds, or at speeds varying with respect to the speed of ground travel.

The foregoing as well as other objects will become more apparent as this description proceeds, especially when considered in connection with the accompanying drawings illustrating the invention, wherein:

FIG. 1 is a fragmentary top plan view illustrating the improved windrower mechanism of the invention as assembled in combination with conventional cutter and conditioner units, suitable provisions for operating the various traveling parts, and for adjusting the relatively fixed parts, being shown;

FIG. 2 is a view in vertical section, along broken line 2—2 of FIG. 1, with a portion of the structure broken away for clarity;

FIG. 3 is a view in vertical section on line 3—3 of FIG. 1 illustrating components of the central drag and idler drum or roller components;

FIG. 4 is a view in vertical section along line 4—4 of FIG. 1, showing features of one of the side drags in association with a traveling side apron, and means for adjusting the drag structure;

FIG. 5 is a view in enlarged scale and section along a line corresponding to line 5—5 of FIG. 3;

FIG. 6 is a fragmentary sectional detail in section on line 6—6 of FIG. 1; and

FIG. 7 is a fragmentary plan view, schematic in nature, showing the general arrangement and relationship of parts of the fixed though adjustable drag structure.

As illustrated best in FIGS. 1 and 2, the improved windrower mechanism of the invention, generally designated by the reference numeral 10, as illustrated in a preferred combination with a standard type of hay cutter, generally designated 12, includes a conventional fixed cutter bar 13 adjacent the forward, lower advance side of the equipment and a rotary bat device 14 coacting therewith, mounted by side bars 15 to extend forwardly of the equipment. These bars may be appropriately mounted on opposite sides of the windrower, and the operation of the bat device 14 and cutter bar 13 is entirely conventional. The hay, schematically shown in FIG. 1 with its stalk or stem designated S, is cut at the cutter bar and deposited rearwardly by the bat unit for handling in the manner hereinafter described, the general nature of which handling will be seen by reference to FIG. 1.

The remaining component of the combined equipment appearing in FIGS. 1 and 2 is a hay conditioner unit, generally designated 17, including appropriate ribbed rollers or drums 18, 19 operating on parallel shafts 20, 21, respectively, which are journalled to the rear of the windrower 10, as by appropriate spaced side plates 22. The conditioner rollers 18, 19 may be appropriately coupled for drive, one from the other, and FIG. 1 shows a sprocket 23 and coacting drive belt 24 by which the conditioner unit 17 may be suitably driven from any desired part of the vehicle which powers the combination, not necessary to illustrate, since provisions to this end will suggest themselves to those skilled in the art.

Generally considered, the improved windrower 10 comprises a combination of traveling, belt-type aprons, including a longitudinally disposed central apron 26, whose endless length is trained about opposed, laterally elongated, forward and rearward rollers or drums 27, 28, the former directly to the rear of the cutter bar 13 and the latter directly in front of the conditioner unit 17. The apron 26 is provided with elongated cleats or ribs 29 extending across its width, and the apron is mounted between plate-like side walls 30, 31 to extend in a mildly upwardly inclined direction from front to rear.

For the purpose of driving the longitudinal apron (the upper reach traveling rearwardly as indicated by an arrow in FIG. 1), a shaft 32 carrying the drum or roller 28 may project outwardly of side wall 30 and is provided with a pulley 33 at its end driven by a belt 34 through the pulley 35 on an end of the lower conditioner roll 21.

Other endless belt-type traveling aprons are designated 38, 39, respectively, being disposed on opposite sides of the longitudinal apron 26, with their upper reaches traveling toward one another. As best shown in FIG. 2, the aprons 38, 39 are both trained about elongated end guide rollers or drums 40, 41 at the respective inner and outer ends thereof, i.e., the inner being adjacent forward extensions 30', 31' of the respective walls 30, 31 which parallel the sides of the longitudinal apron 26, and the outer being adjacent the outer sides of the equipment in zones inwardly of the extreme outer side walls 42 of the equipment. As illustrated in FIG. 2, the respective apron guide drums 40 and 41 are disposed on axes somewhat more abruptly angled upwardly and to the rear than the travel path of the longitudinal apron 26.

A transverse forward bottom bracket 44, located to the rear of the cutter bar 13 (FIG. 2), may be employed to journal the forward ends of the several drums 40 and 41, while further more elevated brackets 45 to the rear, extending respectively between the inner side walls 30, 31 and outer side walls 42, may serve to rotatably mount the rear and upper ends of the guide drums in question.

As shown in FIGS. 1 and 2, the inner drums 40 are secured on shafts 46, 47 journalled in the respective brackets 44, 45 and projecting upwardly and to the rear of the latter, and pulleys 48, 49 fixed on these respective shafts are connected by a twisted transverse belt 50. A further drive pulley 51 is secured on drum shaft 46, being adapted to be operated by a belt 52 from any suitable operating part of the windrower, for example, the rear guide roller or drum 28 for apron 26. Thus, the transversely acting aprons 38, 39 have their upper reaches driven in opposite directions toward one another and toward the longitudinal apron 26 therebetween, at an elevation as in FIG. 2 of the drawings. Aprons 38, 39 are equipped with longitudinally disposed cleats or ribs 53 extending across the respective widths thereof, and the direction of travel of the upper apron reaches is indicated by arrows in FIG. 1.

The windrower unit 10 further includes a fixed but longitudinally adjustable drag structure, generally designated 55, made up of a pair of like side drags 56, 57, one on either side of an individually adjustable central drag unit 58. These drag members 56, 57, 58 are adapted to be positioned in substantially coplanar relation to one another and, as illustrated in FIGS. 2, 3 and 4, at an acute angle to the path of transverse travel of the side aprons 38, 39. For the mounting of the side drags 56, 57, a guide rod 59 (FIGS. 1 and 4) is mounted on each of the outer side walls 42 of the windrower, being spaced inwardly of that wall and at an upward inclination from front to rear corresponding to that of the respective apron 38 or 39 above which the respective drag 56 or 57 is positioned. These rods are each slidably engaged by an elongated tubular guide sleeve 60, the purpose of which will appear.

Similarly, and as shown in FIG. 2, the walls 30', 31' of the unit 10 (which extend forwardly and downwardly past the zone of the drag structure 55) are each equipped with a guide rod 61 secured thereon and spaced outwardly of the inner wall surface, and at the same inclination as the previously mentioned outer guide rods 59. Rods 61 each slidably receive an elongated tubular guide sleeve 62 similar to the sleeve 60. When the sleeves 60, 62 are longitudinally adjusted on the respective sets of rods 59, 61, they may be secured in adjustable position by manipulation of a rod engaging set screw 63 on each sleeve.

As illustrated in FIGS. 1, 2 and 4, the side drag 56 (of which the opposite side drag 57 is a duplicate) is in the form of a sheet metal plate 65 of appropriate gage, and it is formed at its lower, forward edge to provide a trunnion bead or eye 66, by which it is appropriately journalled at its respective inner and outer ends on extension lugs 67, 68 of the respective inner and outer guide sleeves 62, 60. Thus, the side drags 56, 67 are mounted for adjustment along the guide rods 59, 61, under manipulation by means to be described. For the purpose of enabling an angular adjustment of the drags 56, 57, about the respective pivots thereof at 66, each thereof carries an adjusting linkage, generally designated 70, of the character shown in FIGS. 2 and 4. As illustrated, each linkage 70 comprises a link 71 pivotally connected at 72 to an extension 73 on one end of a box-section cross bar 74, which is secured along the rear and upper edge of the side drag in question. The link 72 is pivotally connected at 75 to a further link or arm 76, which in turn has an adjustable sliding and pivotal connection at 77 to an upright extension 78 on the rear end of one of the respective guide sleeves 60 or 62. A lock nut 78' may be tightened to hold this linkage fixedly, once the appropriate angular adjustment of the plate 65 and the side drags 56 and 57 has been made.

Each of these drags 56, 57 is provided with a plurality of curved ribs 80 on its outer surface, the purpose of which is to assist in guiding the hay stems as they lie on the drag and are urged laterally inwardly by the respective side aprons 38 and 39.

The center drag unit 58 includes a sheet metal plate member 82 which is slidably guided, as illustrated in FIG. 6, in ways of 83 which extend longitudinally along either inner end of the respective side drags 56, 57. The lower and forward edge of the center plate 82 is equipped with a plurality of laterally spaced upright blades 84 of arcuate outline, which receive the hay stalks therebetween and prevent side tilting thereof. As drag plate 82 is positioned between the side drags 56, 57, its edges are guided by the latter, the lower and forward edge of the plate 82 terminating rearwardly of the corresponding edges of the drags 56, 57. A rear and upper extension 86 of the plate 82 projects beyond the side drags 56, 57; and at this extension the plate 82 of central drag unit 58 is held in position, as by means of a stud 87 selectively positioned in one of a series of holes 88 (FIG. 1) of plate 82 and engaged in the cross piece 74. Thus the overall, effective front-to-rear dimension of the center drag unit 58 may be adjusted as desired.

For the purpose of mechanically adjusting the above described side and central drag structure 55 (FIGS. 1, 2 and 3), the respective outer side guide sleeves 60 have secured thereto, at their upper end and rear ends, the ends of an elongated tension cable 90, which cable is trained about fixedly journalled guide pulleys 91 rearwardly of the sleeves, and is then brought about further pulleys 92 fixedly journalled on an upright bracket unit 93 on the side plate 31 of the windrower. The cable extends to the rear from guide pulleys 92 and is wrapped a number of times about a friction member or drum 94, also rotatably mounted on a fixed bracket 94'; and a pawl and ratchet device 96 is employed to operate friction drum 94 and cable 90, thus to adjust the drag structure 55 along the length of the respective guide rods 59, 61.

The windrower, as herein illustrated, is completed by an idler roller or drum 95 disposed directly beneath the central drag unit 58. Drum 95 is carried on a shaft 95' (FIG. 5) rotatably mounted on the forward ends of a pair of like rigid mounting bars 96, with suitable provisions made for journalling the drum 95 for free, idling rotation. Bars 96 are adjustably secured, adjacent the rear inclined ends thereof, by mounting the same to the inner side walls 30, 31 of the structure, a series of holes 97 being provided in the walls for this purpose. As further illustrated in FIGS. 1 and 5, the idler drum 95 is provided with a transversely spaced series of annular ribs 98 about its drum-like periphery, these drums assisting in guiding the hay as it is traveled to the rear along the zone of the central drag and longitudinal apron 26.

If desired, suitable protecting side plates 100 (FIGS. 1 and 2) may be provided on the outer side walls 42 of the windrower to overlie the operating parts therebeneath and protect the same from being clogged by foreign matter.

It is seen from the above that the invention provides a windrower mechanism by which the direction of the hay stems S and their end butts may be reversed, in the manner indicated generally in FIG. 1. As deposited by the bat cutter device 14, the cut stalks S have their end butts facing forwardly of the direction of advance of the equipment. As the stems fall onto the side drags 56, 57, they come under the influence of the respective inwardly traveling aprons 38, 39 and the ribs 80 of the fixed drags 56, 57 thereabove, causing the stems to be drawn laterally inwardly toward the central longitudinal apron. As received from above from the central drag 58, the stems also reverse their direction in traveling downward and about idler drum 95, whence they, along with those from side aprons 38, 39, are progressed to the rear to the conditioning unit 17. The latter operates upon the stems in the usual manner; and the butts of the stems are positioned upwardly, for the improved drying of the hay without rot and with full preservation of its food value.

As indicated above, the windrower unit 10 may be constituted by any desired combination of side aprons 38, 39 with central apron 26, and with side drags, in accordance with the requirements dictated by prevailing conditions.

What I claim as my invention is:

1. A hay windrower mechanism comprising a support adapted to travel along a field, an endless apron having forward and rearward, horizontally extending guide members rotatably mounted on said support, about which guide members said apron is trained for movement of an upper reach thereof rearwardly of the direction of travel of said support, a further endless apron at a side of said first named apron having spaced guide members extending in the general direction of said support travel about which said further apron is trained for movement of its upper reach toward said first named apron, a drag structure having means mounting the same on said support in position above said first named and further aprons, and means to drive said aprons for said respective movements of the upper reaches thereof, said aprons and drag structure having elements thereon causing hay deposited thereon to move inwardly toward and on said first named apron while reversing the direction of disposition of the stems of the hay, said drag structure comprising a drag plate above said further apron and a drag plate above said first named apron adjustable longitudinally in relation to said first plate.

2. A hay windrower mechanism comprising a support adapted to travel along a field, an endless apron having forward and rearward, horizontally extending guide members rotatably mounted on said support, about which guide members said apron is trained for movement of an upper reach thereof rearwardly of the direction of travel of said support, a further endless apron at a side of said first named apron having spaced guide members extending in the general direction of said support travel about which said further apron is trained for movement of its upper reach toward said first named apron, a drag structure having means mounting the same on said support in position above said first named and further aprons and in rearward and upward inclination thereto, said means including means for adjusting the angularity of said inclination, and means to drive said aprons for said respective movements of the upper reaches thereof, said aprons and drag structure having elements thereon causing hay deposited thereon to move inwardly toward and on said first named apron while reversing the direction of disposition of the stems of the hay, said drag structure comprising a drag plate above said further apron and a drag plate device above said first named apron adjustable longitudinally in relation to said first plate.

3. A hay windrower mechanism comprising a support adapted to travel along a field, an endless apron having forward and rearward, horizontally extending guide members rotatably mounted on said support, about which guide members said apron is trained for movement of an upper apron reach rearwardly of the direction of travel of said support, further endless aprons on either side of said first named apron each having spaced guide members extending in the general direction of said support travel about which said further aprons are trained for movement of their upper reaches toward said first named apron, a drag structure having means mounting the same on said support in position above said first named and further aprons, said drag structure comprising drag plates above said respective further aprons and a drag plate device above said first named apron adjustable longitudinally in relation to said first plates, and means to drive said aprons for said respective movements of the upper reaches thereof, said aprons and drag structure having elements thereon to cause hay deposited thereon to move inwardly toward and on said first named apron while reversing the direction of disposition of the stems of the hay.

4. A hay windrower mechanism comprising a support adapted to travel along a field, an endless apron having forward and rearward, horizontally extending guide members rotatably mounted on said support, about which guide members said apron is trained for movement of an upper apron reach rearwardly of the direction of travel of said support, further endless aprons on either side of said first named apron each having spaced guide members extending in the general direction of said support travel about which said further aprons are trained for movement of their upper reaches toward said first named apron, a drag structure having means mounting the same on said support in position above said first named and further aprons and in rearward and upward inclination thereto, said drag structure comprising drag plates above said respective further aprons and a drag plate device above said first named apron adjustable longitudinally in relation to said first plates, said mounting means including means for adjusting the angularity of said inclination and the longitudinal position of said drag structure in the direction of movement of said first named apron, and means to drive said aprons for said respective movements of the upper reaches thereof, said aprons and drag structure having elements thereon to cause hay deposited thereon to move inwardly toward and on said first named apron while reversing the direction of disposition of the stems of the hay.

5. A hay windrower mechanism comprising a support adapted to travel along a field, an endless apron having forward and rearward, horizontally extending guide members rotatably mounted on said support, about which guide members said apron is trained for movement of an upper apron reach rearwardly of the direction of travel of said support, further endless aprons on either side of said first named apron each having spaced guide members extending in the general direction of said support travel about which said further aprons are trained for movement of their upper reaches toward said first named apron, a drag structure having means mounting the same on said support in position above said first named and further aprons, said drag structure comprising drag plates above said respective further aprons and a drag plate device above said first named apron adjustable longitudinally in relation to said first plates, means to drive said aprons for said respective movements of the upper reaches thereof, said aprons and drag structure having elements thereon to cause hay deposited thereon to move inwardly toward and on said first named apron while reversing the direction of disposition of the stems of the hay, and an idler drum mounted on said support for rotation on an axis transverse of and below said drag structure.

6. A hay windrower mechanism comprising a support adapted to travel along a field, an endless apron having forward and rearward, horizontally extending guide members rotatably mounted on said support, about which guide members said apron is trained for movement of an upper apron reach rearwardly of the direction of travel of said support, further endless aprons on either side of said first named apron each having spaced guide members extending in the general direction of said support travel about which said further aprons are trained for movement of their upper reaches toward said first named apron, a drag structure having means mounting the same on said support in position above said first named and further aprons and in rearward and upward inclination thereto, said drag structure comprising drag plates above said respective further aprons and a drag plate device above said first named apron adjustable longitudinally in relation to said first plates, said mounting means including means for adjusting the angularity of said inclination and the longitudinal position of said drag structure in the direction of movement of said first named apron, means to drive said aprons for said respective movements of the upper reaches thereof, said aprons and drag structure having elements thereon to cause hay deposited thereon to move inwardly toward and on said first named apron while reversing the direction of disposition of the stems of the hay, and an idler drum mounted on said support for rotation on an axis transverse of and below said drag structure.

7. A hay windrower mechanism comprising a support adapted to travel along a field, an endless apron having forward and rearward, horizontally extending guide members rotatably mounted on said support, about which guide members said apron is trained for movement of an upper reach thereof rearwardly of the direction of travel of said support, a further endless apron at a side of said first named apron having spaced guide members extending in the general direction of said support travel about which said further apron is trained for movement of its upper reach toward said first named apron, a drag structure having means mounting the same on said support in position above said first named and further aprons, and means to drive said aprons for said respective movements of the upper reaches thereof, said aprons and drag structure having elements thereon causing hay deposited thereon to move inwardly toward and on said first named apron while reversing the direction of disposition of the stems of the hay, said drag structure comprising a drag plate above said further apron and a drag plate above said first named apron.

8. A hay windrower mechanism comprising a support adapted to travel along a field, an endless apron having forward and rearward, horizontally extending guide members rotatably mounted on said support, about which guide members said apron is trained for movement of an upper reach thereof rearwardly of the direction of travel of said support, a drag structure having means mounting the same on said support in fixed position above said apron, said drag structure comprising a drag plate above said apron, means for driving said apron so as to effect rearward movement of its upper reach, and an idler drum mounted on said support between said drag plate and apron for rotation about a transverse axis, said drag plate and drum being effective to cause hay deposited thereon to move toward and on said apron while reversing the direction of disposition of the stems of the hay.

9. The mechanism defined in claim 8 in which said drag plate is provided with laterally spaced longitudinally extending guide elements and said drum is provided with axially spaced circumferential guide elements.

10. A hay windrower mechanism comprising a support adapted to travel along a field, a first endless apron having forward and rearward, horizontal extending guide members rotatably mounted on said support, about which guide members said apron is trained for movement of its upper reach rearwardly of the direction of travel of said support, a second endless apron at a side of said first apron having spaced guide members extending in the general direction of said support travel about which said second apron is trained for movement of its upper reach toward said first apron, a drag structure having means mounting the same on said support in fixed position above said first and second aprons, and means to drive said aprons for said respective movements of the upper reaches thereof, said drag structure comprising a first drag plate above said first apron and a second drag plate above said second apron, said second drag plate having guide elements thereon spaced apart longitudinally of the direction of movement of said second apron and inclined relative thereto, said first drag plate having laterally spaced guide elements extending longitudinally with respect to the direction of movement of said first apron, said drag plates and guide elements being effective to cause hay deposited thereon and on said aprons to move inwardly toward and on said first apron while reversing the direction of disposition of the stems of the hay.

11. The mechanism defined in claim 10 including an idler drum mounted on said support between said first drag plate and said first apron for rotation about an axis extending transversely of the direction of movement of said first apron.

12. The mechanism defined in claim 11 in which said aprons are provided with upstanding ribs spaced longitudinally of and extending transversely of the direction of their respective movements.

References Cited in the file of this patent

UNITED STATES PATENTS

| | | |
|---|---|---|
| 406,789 | Sprague et al. | July 9, 1889 |
| 688,330 | Peek | Dec. 10, 1901 |
| 2,700,859 | Vigum et al. | Feb. 1, 1955 |
| 2,908,126 | Dryrdahl | Oct. 13, 1959 |